United States Patent

[11] 3,582,928

[72] Inventor Robert M. Gaertner
 9315 Queens Lane, Oxon Hill, Md. 20022
[21] Appl. No. 842,316
[22] Filed July 16, 1969
[45] Patented June 1, 1971

[54] IMPENDING FAILURE INDICATION DEVICE FOR BEARINGS
 9 Claims, 1 Drawing Fig.
[52] U.S. Cl. .................................................. 340/231,
 340/227F, 340/270, 340/27
[51] Int. Cl. ...................................................... G08b 21/00
[50] Field of Search .......................................... 340/231,
 227 F, 228, 236, 270; 73/341, 64

[56] References Cited
 UNITED STATES PATENTS
 2,399,036 4/1946 Jones ............................ 340/231
 3,487,467 12/1969 Gruber ......................... 340/270X Primary Examiner—Kathleen H. Claffy
Assistant Examiner—Jan S. Black
Attorneys—Edgar J. Brower, T. O. Watson, Jr. and Boardman S. Mowry ABSTRACT: An engine-bearing monitoring device having a pair of thermocouples connected across the bearing and a comparator connected to the thermocouples through amplifiers for measuring the temperature differential across the bearing. A threshold control is connected to the comparator and indicators in turn are connected to the control which indicators are operated upon the temperature differential reaching a threshold amount whereby to indicate that the bearing is not operating normally or being lubricated properly and that complete failure thereof is impending. The tachometer generator of the engine is connected to the threshold control to vary the threshold in accordance with the speed of the engine shaft.

PATENTED JUN 1 1971 3,582,928
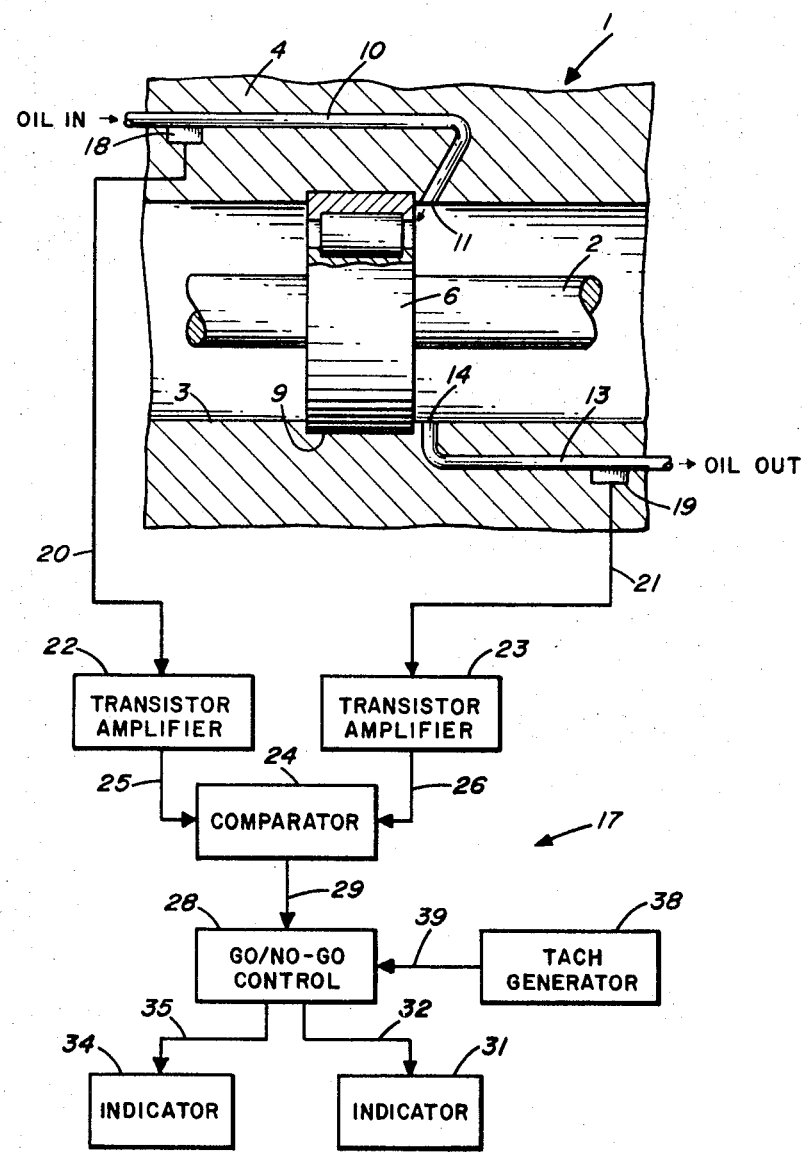
INVENTOR
ROBERT M. GAERTNER
BY Thomas O. Watson Jr.
Boardman S. Mowry
ATTORNEYS

IMPENDING FAILURE INDICATION DEVICE FOR BEARINGS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention pertains to indicating means of the instrumentation type and, more particularly, to heat-indicating means for bearings. The device of the invention operates an indicator thereof when the temperature of a bearing increases slightly over a predetermined safe value or series of values (where the speed of the shaft varies).

In the past, there has been no known way of learning beforehand when a bearing of an aircraft turbine engine, for instance, was first encountering abnormal wear, i.e., entering the failure process. The best industry has been able to do to date has been to make use of vibration pickups and spectrometric oil analysis on the ground. Neither of these methods can pinpoint the particular bearing in trouble and further, the bearing must be well along in deterioration before these methods show anything. The time between an indication by these methods that all is not well with some bearing and its full failure is frequently small. If such detectable deterioration point is reached when the aircraft is in takeoff or in the air, the rapidly ensuing complete failure of the engine bearing can take place without warning; often with disastrous results to aircraft and personnel.

Because of the greatly increased weights and much larger shafts of the new jet engines which increase the loadings on the bearings and the speeds of the shaft surfaces, presently known bearing materials are being pushed to the extreme. Also, lubricants must run at even more elevated temperatures because of this and also because hotter combustors causes thinning out of the lubricants and consequently, less lubricating effect. Thus, the rate of bearing failures is expected to go up and the time between onset of failure to complete "wrap up" will be smaller than ever experienced.

SUMMARY OF THE INVENTION

By means of the present invention, the condition of any one and preferably each engine bearing, for instance, is continually monitored with any impending bearing failure being immediately indicated to the pilot to give him a warning and as much time as possible prior to complete bearing and resultant engine failure for effecting a safe landing. There has been no prior device that will do what the device of this invention will as above explained.

Besides often saving an entire aircraft and its personnel from total destruction the device of the present invention can eliminate the present costly and frequent engine teardowns by the military every 500 hours with their usual finding of good bearings. With this invention, engines will be able to operate for many thousands of hours free from such teardowns until abnormal wear first appears and ultimate failure is predicted by the device giving its warning while the bearing still has a substantial time to go before complete failure, at which warning time or at the first opportunity thereafter the engine can be torn down and all the bearings replaced.

Also and most important, with the warning given by the instant device, which is given by no prior art device, engine repairs can usually be made before there is any serious damage to the engine thus effecting great savings.

In the device of the present invention, the temperature increase across a bearing during operation thereof, i.e., the heat produced by that bearing, or a substantial portion of such increase is monitored and when the increase or portion first exceeds a predetermined amount or values along a temperature to r.p.m. curve (where the speed of the shaft varies as in an aircraft engine) to indicate that abnormal wear has started an indication of this is given as by a warning light going on or popping out of a button. Also of great importance, should an oil jet or passage to a bearing clog up with the bearing heating up for lack of lubrication cooling, the device will immediately give its warning and some time before the bearing burns up.

OBJECTS OF THE INVENTION

A primary object of the invention is to provide a safety device which gives a warning when bearings overheat a certain amount indicative of improper bearing functioning or inadequate lubrication.

Another important object is to provide such a device which minimizes bearing and engine damage by giving warning of overheated bearings and allowing shutting down of the engine or machinery as soon as possible before any more serious damage is done.

A further object of great importance is to provide such a device which can eliminate the present costly engine teardowns by the military every 500 hours with their usual finding of good bearings.

Yet another object of this invention is to provide a bearing-monitoring device which will permit elimination of constantly repeated spectrometric oil analysis and also vibration pickup efforts in an attempt to defect defective bearings.

Other objects, advantages and novel features of the invention will become apparent from the following detailed description of the invention when considered in conjunction with the accompanying drawing.

BRIEF DESCRIPTION OF THE DRAWING

The single FIGURE is a block diagram of the embodiment shown applied to a bearing and the adjacent portions of a jet engine of an aircraft incorporating this bearing shown fragmentarily and partly in cross section.

DESCRIPTION OF THE PREFERRED EMBODIMENT

The reference numeral 1 generally designates a modern jet aircraft engine which includes an engine shaft 2 extending within an open portion or cavity 3 in the engine portion 4. A roller bearing 6 of a conventional construction supports part of the shaft 2 being received within the sidewall portion 9 of the engine portion 4. An oil inlet passageway 10 which is connected to the pressure-lubricating system of the engine terminates adjacent the outer race of the bearing 6 at 11. The lubricating and cooling oil is picked up by an oil outlet passageway 13 at its entrance 14 also located near the outer race of the bearing 6 but at the opposite side of the engine cavity 3 from the oil inlet 11. The inlet 11 is so located, directed and formed as to cause the oil to be squirted into the working parts of the roller bearing 6 for lubrication and cooling thereof. The outlet 14 picks up the oil after it has flowed through the bearing 6 and out therefrom onto the wall of the cavity 3.

The preferred form of the device of the present invention is generally designated by the numeral 17 and comprises a pair of thermocouples 18 and 19 positioned in the engine portion 4 so as to be in contact with the oil flowing through the passageways 10 and 13, respectively. These thermocouples are preferably of a type which is sensitive to a change in temperature of a relatively few degrees with good accuracy although the particular sensitivity and accuracy of the thermocouples are not critical to operation of the instant device so long as thermocouples which are rather sensitive and accurate are used.

The thermocouples 18 and 19 are connected to transistor amplifiers 22 and 23, respectively, by means of conductors 20 and 21, respectively, which amplifiers are in turn connected to a temperature discriminator or comparator 24 by means of conductors 25 and 26, respectively. The discriminator is connected to a "Go/No-Go" or threshold control unit 28 by means of conductor 29. An indicator 31 is connected to the control unit 28 by means of conductor 32. Indicator 31 may be a light or a button that pops out when energized. The amplifiers 22 and 23, comparator 24, control unit 28, and indicator 31 may be of conventional construction, the details of which form no part of the present invention. Preferably, indicator 31 is mounted in the cockpit of the aircraft where the pilot can easily see it.

A second indicator 34, of the pop-out button type for instance, connected to the control unit 28 by conductor 35, may be installed in the engine compartment for inspection by the ground crew, with the indicator 31 being carried in the cockpit of the aircraft for giving its warning to the pilot. The reference numeral 38 designates a tachometer/generator unit of usual construction which is part of the equipment of a jet engine, being operatively connected to the engine shaft 2 in the usual manner (not shown). Conductor 39 connects the unit 38 to the control unit 28 for a purpose which will appear hereinafter.

OPERATION

Considering the operation of the illustrated device, the thermocouples 18 and 19 are mounted across the roller bearing 6 so as to in effect measure or sense the temperatures of the lubricating and cooling oil flowing through the inlet and outlet passageways 10 and 13, respectively, before and after it passes through the bearing 6. The difference in temperature between the upstream and downstream measuring points at 18 and 19 is in effect measured or determined by the comparator 24 which receives electrical current from the thermocouples 18 19, amplified by amplifiers 22 and 23, proportional to the temperatures of the oil flowing past the points at 18 and 19. This temperature difference is in effect, actually an electrical current proportional thereto is, passed from the comparator 25 to the control unit 28 through the conductor 29. The latter unit is adjusted to allow an electrical flow or signal to be passed therefrom to the warning indicator 31, and also to 34 when provided as in the illustration, for operation thereof when the temperature difference of the oil between the points at 18 and 19 reaches an abnormal amount for the speed of the shaft 2 due to the production of an abnormal amount of heat by the bearing 6 for that shaft speed. Such abnormal heat production is in turn due to abnormal wear taking place in the bearing because of skidding, skewing, or spalling occurring therein, i.e. improper operation, indicative of impending full bearing failure.

The operation of the device so far applies to a machine or equipment in which the shaft rotates at substantially a constant speed as, for instance, high speed generating equipment on the ground as well as to an aircraft engine operating at any shaft speed. Since the shaft speed of the aircraft engine 1 varies, the temperature across the bearing 6 will increase as the speed of the shaft increases and decrease as the speed decreases. Such increase in the heat produced by the bearing upon increase in engine speed is normal, being due to the more rapid rolling of the rollers.

To make allowances for the various increases and decreases of the engine speed, i.e. the varying normal heat produced by the bearing itself, at least a substantial portion of such bearing heat being measure or monitored by the present device, (there is some heat loss), the tachometer/generator 38 of the aircraft engine is connected to the Go/No-Go control unit 28 as previously stated. This connecting serves to electrically bias or adjust the control unit 28 so that an increased speed of the shaft 2 will not cause the unit 28 to send out a signal to the indicators 31 and 34 so long as the heat produced by the bearing remains within a normal range for the increased speed. Since the amount of heat produced by the bearing will increase with the speed of the shaft but not at the same rate as the increase in shaft speed, compensation means for this is included within the control 28 in the circuit portion thereof connecting the same with the conductor 39. Such compensation can take the form of conventional type means well known in the electrical arts.

When the indicator 31 in the cockpit of the aircraft operates, the pilot knows that the bearing is no longer operating properly and that full failure thereof is impending. With this earliest possible warning, the pilot will have the maximum amount of time possible in which to effect a safe landing before complete failure of the bearing and of the engine occurs. Upon safe landing, of course, the bearing and preferably all the engine main bearings are replaced.

Where there is no indicator in the cockpit of the aircraft but only in the engine compartment, observation by the ground crew of the operated or popped out condition of the indicator where of the pop-out button type either before take off or after landing, of course, calls for the bearing or all the bearings to be replaced. Where there is an indicator in the engine compartment in addition to one in the cockpit as 34 in the illustration, observation by the ground crew that such indicator is in operated condition prior to takeoff would result in grounding the aircraft for bearing replacement. The same would apply where the pilot brought his aircraft down without noticing the operated or "on" condition of the indicator in the cockpit as, for instance, where the indicator operated during the landing process or even during combat when the pilot was exceptionally busy.

A device such as that illustrated and above disclosed would normally be provided for each engine bearing although such a device could be employed on only one principal bearing if a chance wants to be taken that all of the bearings will remain in about the same condition and that none of the other bearings will enter the state of abnormal wear too much before that state is entered by the monitored bearing.

Where the invention is used with machinery or the like in which the shaft being supported by the bearing being monitored has a substantially constant speed when operating, the Go/No-Go control unit 28 may still be employed but without any connection thereto from a tachometer/generator if employed or, the control unit 28 may be eliminated, if desired, with an indicator such as a light bulb being connected directly to the comparator 24, such light bulb being so selected that it will not go on or at least very brightly unless the voltage coming from the comparator 24 is at least a certain or predetermined amount produced as the result of the monitored bearing producing an abnormal amount of heat indicative of impending failure thereof. Or, instead of a light bulb in the latter instance, a dial- and needle-type indicator having a red or danger zone on the dial may be employed. In addition to an indicator or in lieu thereof, in the case of stationary machinery or the like especially, switch or circuit breaker means may be connected to the comparator operable upon the voltage from the latter reaching a certain value or connected to the Go/No-Go control for automatically shutting off the machinery upon the monitored bearing producing a predetermined undesirable amount of heat indicative of improper operation or the reaching of a point close to a serious level of failure.

An alternate to measuring the temperature differential between the oil in the passageways 10 and 13 at points 18 and 19 therealong would be to measure the delta temperature across the bearing between the "oil in" the inlet passageway 10 as at 18 and one the bearing races, the outer one being more practical, since either race would be heated by the heat produced by the bearing prior to transmission of the heat to the oil entering the outlet passageway 13. In this arrangement, the second thermocouple would be placed in contact with the outer race, for example, preferrably between the race and its supporting surface such as wall portion 9 of the engine in the illustrated form. Technically, the first thermocouple 18 would not necessarily have to be placed along the oil passageway 10 but could be located so as to pick up the temperature of the engine portion 4, for example, rather well removed from and preferably ahead of the bearing being monitored, in which case a temperature differential between the two points of location of the thermocouples because of the production of heat by the bearing could still be picked up.

It is pointed out that although preferred, the amplifiers 22 and 23 would not necessarily have to be employed. While thermocouples have been disclosed, any other temperature-related measuring device taking readings across the bearing being monitored would also be acceptable. Although the present is particularly applicable to rolling, i.e. ball and roller, type bearings including thrust bearings, it is not desired to necessarily limit the invention to the same.

It is thus seen that in the preferred application and form of the invention a most valuable bearing health or condition monitoring and warning device has been provided which will afford the maximum possible time to a pilot during which to bring his aircraft down safely before complete bearing and engine failure occur and/or permit a bearing to be replaced before any more serious damage to the engine has been had. Also, the present most expensive and normally futile routine engine teardowns by the military every 500 hours and also the constantly repeated and unsatisfactory spectrometric oil analysis and vibration pickup efforts can be eliminated by the use of the present invention.

Obviously many modifications and variations of the present invention are possible in the light of the above teachings.

What I claim is:

1. In combination with apparatus having a rotatable member and a bearing receiving the member and giving support thereto, a device comprising:
   means connected across the bearing at two places and responsive to a difference in temperature between the two places during rotation of said member which is effective to send out an electrical current having a voltage which increases as the difference in temperature across the bearing between the two places increases for any reason during rotation of said member and
   utilization means electrically connected to the temperature-responsive means for receiving said current, said utilization means including means for compensating for variations in temperature caused by a change in the rotational speed of the rotatable member.

2. The subject matter of claim 1 wherein said utilization means comprises indicator means.

3. The subject matter of claim 1 wherein said temperature-responsive means comprises:
   a pair of thermocouples connected to said apparatus at said two places; and
   voltage comparator means to which the thermocouples are connected effective to send out to the utilization means said current having a voltage proportional to the difference between the voltages coming into the comparator means from the thermocouples.

4. The subject matter of claim 1 in which the bearing is a rolling-type bearing, said apparatus including lubrication means for the bearing comprising:
   passage means for the supply of fluid lubricant under pressure into the working parts of the bearing; and
   one of said two places being along said passage means for exposure of the temperature-responsive means to the heat of the lubricant flowing through said passage means.

5. The subject matter of claim 1 in which the bearing is a rolling-type bearing, said apparatus including lubrication means for the bearing comprising:
   first passage means for the supply of fluid lubricant under pressure into the working parts of the bearing;
   second passage means for conducting the lubricant away after it has passed through the bearing; and
   said two places being along said first and second passage means, respectively, for exposure of the temperature-responsive means to the heat of the lubricant flowing through said first and second passage means, respectively.

6. The subject matter of claim 1 wherein said compensation means comprises:
   threshold means for sending out an electrical current therefrom only upon its receiving from said temperature-responsive means a current having a voltage which has reached a predetermined amount higher than a normal voltage for a particular rotational speed of said member indicative of the bearing producing an abnormal amount of heat, and additional means operatively connected to said member and electrically connected to the threshold means for so electrically biasing the latter when there are changes of the rotational speed of said member as to automatically adjust the threshold voltage of the threshold means for the different speeds of said member.

7. The subject matter of claim 6, said utilization means including warning indicator means connected to the threshold means for receiving the electrical current sent out from the latter means.

8. The subject matter of claim 7, said utilization means including warning indicator means connected to the threshold means for receiving the electrical current sent out from the latter means, the bearing being a rolling-type bearing, said apparatus including lubrication means for the bearing comprising passage means for the supply of fluid lubricant under pressure into the working parts of the bearing, one of said two places being along said passage means for exposure of the temperature-responsive means to the heat of the lubricant flowing through said passage means.

9. The subject matter of claim 8, said device being in combination with an aircraft having a cockpit for at least a pilot and an engine with a shaft, said apparatus being the engine and said member thereof being the shaft, said warning indicator means being located in the cockpit.